United States Patent
Wexler et al.

(10) Patent No.: US 10,326,680 B2
(45) Date of Patent: Jun. 18, 2019

(54) GENERIC OPERATIONS, ADMINISTRATION, AND MAINTENANCE (OAM) FUNCTION

(71) Applicant: HUAWEI TECHNOLOGIES CO., LTD., Shenzhen (CN)

(72) Inventors: Mishael S. Wexler, Munich (DE); Feng Li, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 48 days.

(21) Appl. No.: 15/384,718

(22) Filed: Dec. 20, 2016

(65) Prior Publication Data

US 2017/0104660 A1 Apr. 13, 2017

Related U.S. Application Data

(63) Continuation of application No. PCT/EP2014/064611, filed on Jul. 8, 2014.

(51) Int. Cl.
*H04L 12/24* (2006.01)
*H04L 12/26* (2006.01)
*H04L 12/46* (2006.01)

(52) U.S. Cl.
CPC .......... *H04L 43/10* (2013.01); *H04L 12/4633* (2013.01); *H04L 41/04* (2013.01);
(Continued)

(58) Field of Classification Search
CPC ............ H04L 43/0811; H04L 43/10; H04L 12/4641; H04L 12/66; H04L 45/00
See application file for complete search history.

(56) References Cited

U.S. PATENT DOCUMENTS 9,191,290 B2 * 11/2015 Ding ............... H04L 43/062
2012/0069742 A1 3/2012 Kaufmann et al.
(Continued)

FOREIGN PATENT DOCUMENTS

CN 1543162 A 11/2004
CN 102624561 A 8/2012
(Continued)

OTHER PUBLICATIONS

P.Jain et al.,"Generic Overlay OAM and Datapath Failure Detection draft-jain-nvo3-overlay-oam-01," IETF, Feb. 12, 2014, 44 pages.
(Continued)

*Primary Examiner* — Chandrahas B Patel
(74) *Attorney, Agent, or Firm* — Leydig, Voit & Mayer, Ltd.

(57) ABSTRACT

A system includes: a processor in electrical communication with a data packet network that includes a first network device having a first network node and a second network device having a second network node. The system also includes a non-transitory memory having stored instructions, when executed by the processor, configured to perform acts including: generating a frame denoting a protocol data unit (PDU) to implement at least one OAM function within the data packet network; encapsulating the PDU in a packet having a header; transmitting the packet from the first network node to the second network node. The PDU is a generic PDU (GPDU) for implementing at least one generic OAM (GOAM) function across the first and second network nodes operating different transmission protocols. The header includes GOAM indication information denoting the presence of the GPDU within the packet.

16 Claims, 8 Drawing Sheets

(52) U.S. Cl.
CPC .......... *H04L 43/14* (2013.01); *H04L 41/0677* (2013.01); *H04L 43/0811* (2013.01)

(56) References Cited

U.S. PATENT DOCUMENTS

| | | |
|---|---|---|
| 2013/0329565 A1 | 12/2013 | Holness et al. |
| 2014/0092751 A1 | 4/2014 | Meilik et al. |
| 2014/0341044 A1 | 11/2014 | Umayabashi et al. |

FOREIGN PATENT DOCUMENTS

| | | |
|---|---|---|
| CN | 103828302 A | 5/2014 |
| EP | 2434697 A1 | 3/2012 |
| WO | 2012155723 A1 | 11/2012 |

OTHER PUBLICATIONS

Tissa Senevirathne et al.,"YANG Data Model for Operations Administration and Maintenance (OAM) draft-tissa-netmod-oam-00.text," IETF, Mar. 29, 2014, 34 pages.

Mishael Wexler,"Generic OAM Mechanism for Packet Networks," Huawei, 5 pages.

International Search Report issued in corresponding International Application No. PCT/EP2014/064611, dated Mar. 31, 2015, 4 pages.

\* cited by examiner

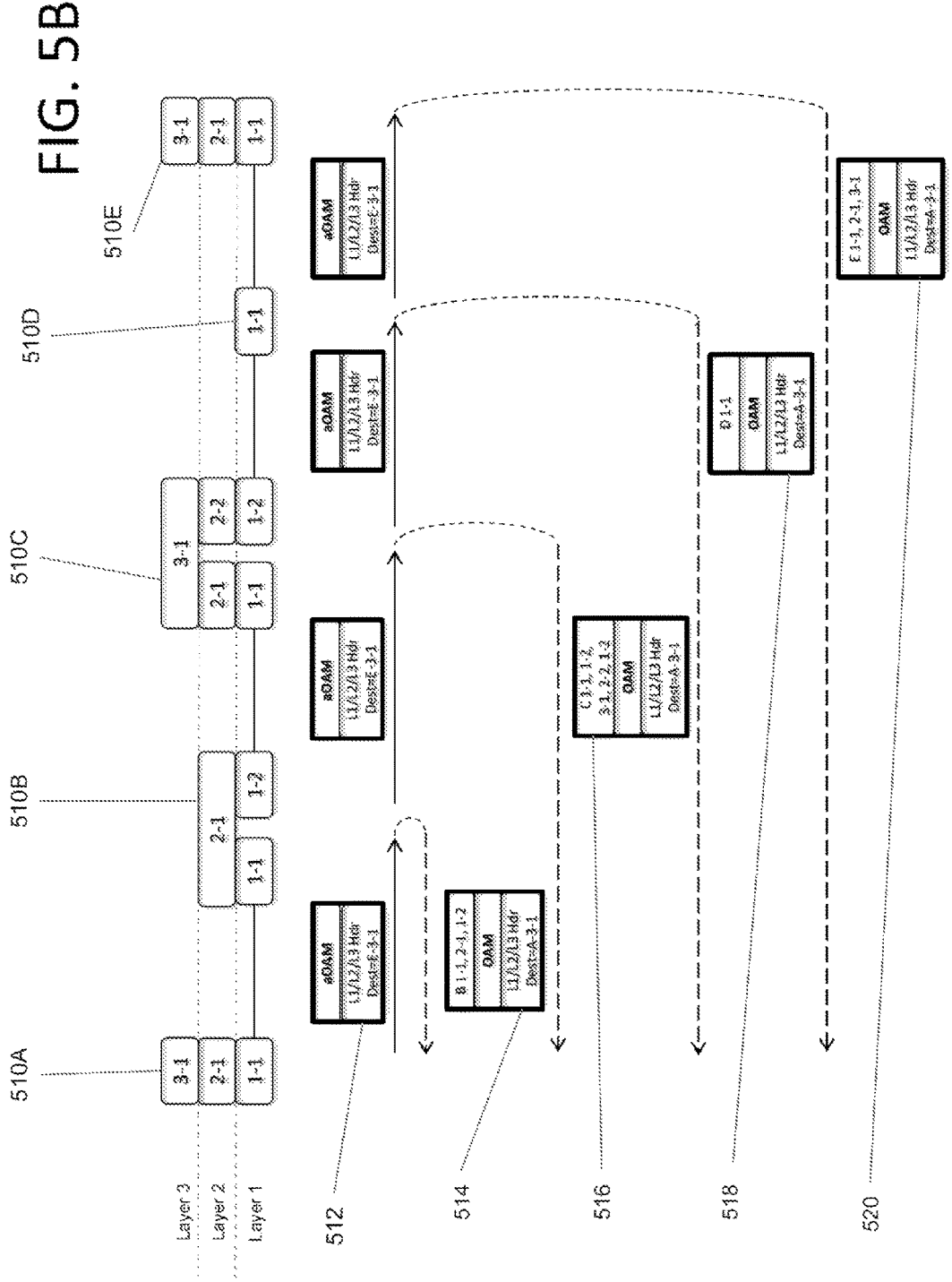

GENERIC OPERATIONS, ADMINISTRATION, AND MAINTENANCE (OAM) FUNCTION

CROSS-REFERENCE TO RELATED APPLICATIONS

This application is a continuation of International Application No. PCT/EP2014/064611, filed on Jul. 8, 2014, the disclosure of which is hereby incorporated by reference in its entirety.

BACKGROUND

The present disclosure relates to systems and methods for network control and, more specifically, but not exclusively, to systems and methods for network operations, administration, and maintenance (OAM).

OAM mechanisms provide several functions used to monitor, troubleshoot and/or maintain the network and/or services. Exemplary OAM functions include:

Continuity check: Checking that the monitored layer and/or entity are alive and providing connectivity.

Connectivity verification: Verifying that the actual connection is consistent with the required connection and no misconnection occurred.

Fault localization: Providing localization of faults in a long chain of nodes and links to ease troubleshooting.

Performance measurement: Monitoring the performance parameters of a network connection.

The abovementioned functions are examples of common and/or basic tools in the OAM framework. Other advanced tools, for example, protection switching, maintenance commands and the like may also be available in the OAM framework.

OAM functions may be available as part of a defined protocol. Each logical network layer may have a predefined protocol for OAM functions at that network layer. Different communication protocols providing services at the same layer may have different OAM functions to serve each respective communication protocol. Table 1 illustrates some examples of protocols to provide OAM functions at different network layers and/or for different communication protocols. The list of sample protocols may be used concurrently in ETH/IP/MPLS transport networks.

TABLE 1

Sample OAM Protocols

| Function | Ethernet OAM | MPLS LSP OAM | IP OAM |
|---|---|---|---|
| Connectivity Check | Y.1731/802.1ag LB | LSP Ping, BFD | Ping, BFD |
| Continuity Verification | Y.1731/802.1ag CV | MPLS-TP BFD | |
| Fault Localization | Y.1731/802.1ag Trace | LSP Trace-route | Trace-route |
| Performance Measurement | Y.1731 Delay/Loss/Jitter | MPLS-TP Delay/Loss/Jitter | T/OWAMP Delay |

Abbreviations for Table 1:
MPLS: Multiple Path Label Switching
LSP: Label Switched Path
ETH: Ethernet
IP: Internet Protocol
LB: Loopback
BFD: Bidirectional Forwarding Detection
CV: Connectivity Verification
TP: Transport Profile
T/OWAMP: Two/One Way Active Measurement Protocol

SUMMARY

It is an object to provide systems and/or methods for performing at least one operation, administration, and maintenance (OAM) function on a data packet network, between two network elements operating different communication protocols, at the same and/or at different logical communication layers.

The foregoing and other objects are achieved by the features of the independent claims. Further implementation forms are apparent from the dependent claims, the description and the figures.

According to a first aspect, method for transmitting packets denoting at least one operation, administration and maintenance (OAM) function on a data packet network, comprising: generating a frame denoting a protocol data unit (PDU) to implement at least one OAM function within the data packet network; encapsulating the PDU in a packet having a header; and transmitting the packet from a first network node to a second network node of the data packet network; where the PDU is a generic PDU (GPDU) for implementing at least one generic OAM (GOAM) function between the first network node and the second network node operating different transmission protocols; where the header includes GOAM indication information denoting the presence of the GPDU within the packet.

According to a second aspect, an apparatus method for transmitting packets denoting at least one operation, administration and maintenance (OAM) function on a data packet network comprises: a processor configured to generate a frame denoting a protocol data unit (PDU) to implement at least one OAM function within the data packet network, and encapsulate the PDU in a packet having a header; and a port configured to transmit the packet from a first network node to a second network node of the data packet network; where the PDU is a generic PDU (GPDU) for implementing at least one generic OAM (GOAM) function between the first network node and the second network node operating different transmission protocols; and where the header includes GOAM indication information denoting the presence of the GPDU within the packet.

According to a third aspect, a method for performing at least one operation, administration and maintenance (OAM) function on a data packet network comprises: receiving a packet having a header and a frame, the frame denoting a protocol data unit (PDU) to implement at least one OAM function within the data packet network, the packet having been transmitted from a first network node to a second network node of the data packet network; implementing the at least one OAM function between the first network node and the second network node; where the PDU is a multi-layer PDU denoting at least one OAM function for implementation within the packet data network; processing a multi-layer indication within the header to process the PDU within the frame by the second network node; and where the at least one OAM function is implemented to provide at least one of multi-layer and intra-layer OAM functionality across the first network node and the second network node operating at the same or different transmission protocols.

According to a fourth aspect, an apparatus method for performing at least one operation, administration and maintenance (OAM) function on a data packet network, comprises: a port configured to receive a packet having a header and a frame, the frame denoting a protocol data unit (PDU) to implement at least one OAM function within the data packet network, the packet having been transmitted from a first network node to a second network node of the data packet network; and a processor configured to implement the at least one OAM function between the first network node and the second network node; where the PDU is a multi-layer PDU denoting at least one OAM function for implementation within the packet data network; the processor is further configured to process a multi-layer indication within the header to process the PDU within the frame by the second network node; and where the at least one OAM function is implemented to provide at least one of multi-layer and intra-layer OAM functionality across the first network node and the second network node operating a different transmission protocols.

According to a fifth aspect, a computer program is provided with a program code for performing a method according to first or third aspect when the computer program runs on a computer.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The disclosure is herein described with reference to the accompanying drawings. With specific reference now to the drawings in detail, it is stressed that the particulars shown are by way of example and for purposes of illustrative discussion of the disclosure. In this regard, the description taken with the drawings makes apparent to those skilled in the art how the disclosure may be practiced.

In the drawings:

FIG. 5B illustrates an example of OAM function operation based on the disclosed method and system.

DETAILED DESCRIPTION

Figure 1:
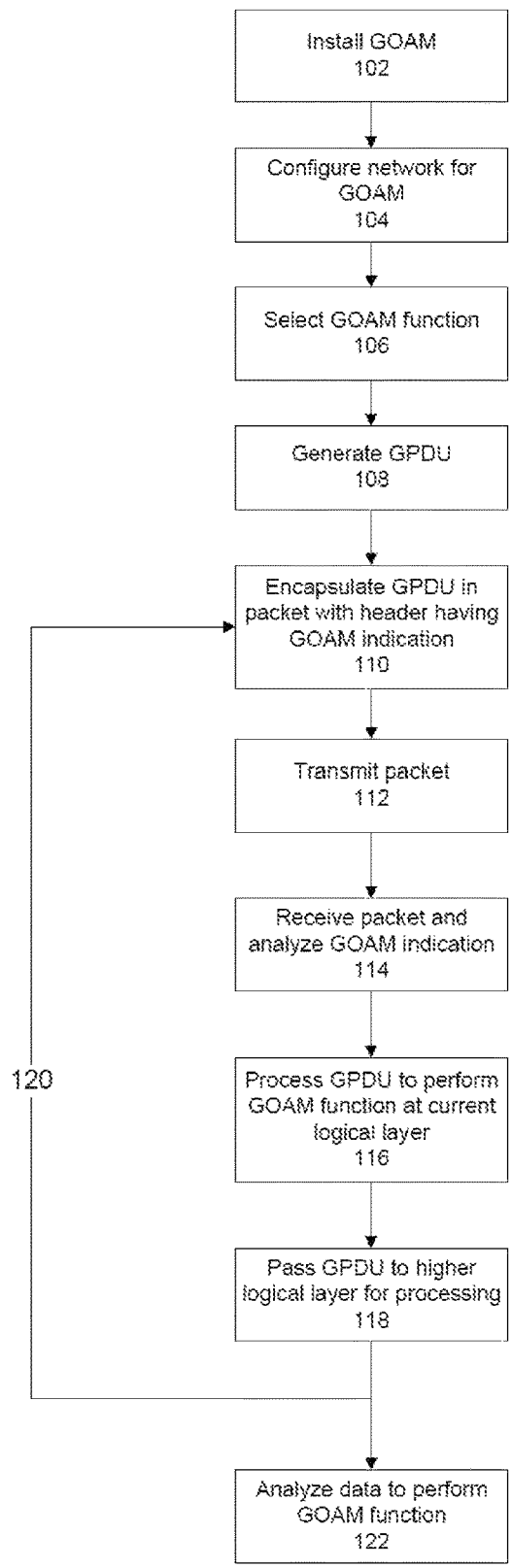
FIG. 1 is a method for executing one or more OAM functions in a packet data network.

As used herein, the phrase logical communication layer means an abstract layer of a communication system, for example, layers 1-7 defined by the open systems interconnection model (OSI), intermediate layers thereof, and/or other abstract layers that may be defined.

As defined herein, the term network device means a physical piece of equipment installed as part of the network, for example, a router, a switch, a hub, a computer, or other equipment. As defined herein, the term network node means a physical and/or virtual (e.g., software defined) network access. The network device may have multiple network nodes, for example, physical ports in which cables are plugged, software ports for software programs to access the network, or other nodes. The network nodes may operate at different logical layers and/or with different communication protocols. For example, a router may have several layer 3 nodes (e.g., IP), several layer 2 nodes (e.g., Ethernet) and/or several layer 1 nodes.

An aspect of the present disclosure relates to systems and methods that allow different network devices operating different OAM functions based on different packet transport protocols to communication with one another. The methods and/or systems define generic OAM (GOAM) functions which may be commonly understood, analyzed and/or processed by different network devices and/or different network nodes, independently of the underlying transport protocol. The GOAM functionality may be executed across different packet transport protocols to achieve a common and/or unified GOAM function across the different transport protocols, instead of, for example, executing different OAM functions for each respective transport protocol. The GOAM functions may be executed across the different transport protocols based on a single applied command, such as a command issued by a software defined network (SDN).

The systems and/or methods define a frame that includes a generic packet data unit (GPDU) for implementing the one or more GOAM functions. The GPDU is independent of the underlying logical layer and/or communication protocol. The same GPDU may be transported across multiple logical layers and/or across different communication protocols, for example, as part of a payload of a transport protocol packet. The same GPDU may be processed by different network nodes, operating at different logical layers and/or operating using different communication protocols. (The GPDU may be copied while remaining the same.) Each respective network node processing the GPDU may provide the respective GOAM function associated with the logical layer of the processing, and/or associated with the communication protocol(s) of the network node. In this manner, the same GPDU may be processed to provide the multi-layer and/or intra-layer GOAM functions, instead of, for example, different PDU being sent and processed at different network nodes that require different PDUs for different logical layers and/or for different communication protocols.

Each GPDU is designed to address one or more GOAM functions, for example, continuity check, loopback (ping), link-trace, alarm indication signals (AIS), reverse defect indication (RDI), locked, automated protection switching (APS), maintenance channel, loss, delay, delay variation, throughput, and/or others.

Optionally, the GPDU includes the GOAM function assigned to multiple transmission protocols and/or multiple logical communication layers.

Optionally, the systems and/or methods include a GOAM indication within a header of a protocol specific packet transporting the GPDU. The GOAM indication denotes the presence of the GPDU within the transporting packet. The GOAM indication denotes that the transporting packet is part of the GOAM mechanism, for execution of one or more GOAM functions.

Optionally the GOAM indication is analyzed by the receiving network node, to process the GPDU to implement the GOAM function associated with the GPDU in the received packet. Alternatively or additionally, the indication is analyzed by the receiving network node, to pass the GPDU to a higher logical layer and/or to a different communication protocol, for analyze, processing and/or forwarding. The indication may denote execution of the GOAM function at all logical layers of the network node, or at certain layers of the network node. In this manner, the GOAM function may be executed across multiple layers and/or multiple communication protocols, optionally based on a single transmitted GPDU.

An aspect of the present disclosure relates to systems and methods for providing a multi-layer framework to provide OAM functionality across different logical communication layers of a packet data network. Alternatively or additionally, the OAM functions are extended over different transport protocols of the same logical communication layer. Existing OAM functions defined by different transport protocols may be extended to provide a uniform function when crossing over logical communication layer and/or cross over different transport protocols. For example, layer 3 IP PING may be extended to provide functionality over layer 2 Ethernet.

The multi-layer and/or cross-protocols functionality may be provided as part of the GOAM functionality, such as when the GOAM functions are used instead of the protocol defined OAM functions. Optionally, the multi-layer functionality, allows OAM and/or GOAM functions to cross over different logical communication layers, for example, across layer 2 and layer 3. Crossing over different logical communication layers may cross over different communication protocols used at each layer. Alternatively or additionally, the systems and/or methods provide OAM and/or GOAM intra-layer functionality, between different communication protocols of the same layer, for example, across different layer 3 protocols. The OAM and/or GOAM functionality may be provided by execution of a single function across the different layers and/or different protocols, such as instead of requiring separate OAM function execution at each respective layer and/or for each respective protocol. Alternatively or additionally, the GOAM functionality is provided by existing defined (or customized) OAM functions originally designed for execution at a single layer and/or for a single communication protocol (e.g., as described in Table 1). The protocol defined OAM function may be extended to provide multi-layer functionality by a multi-layer indication in the header of the encapsulating packet, as described herein in further detail.

As used herein, the term OAM function may sometimes be interchanged with the term GOAM function, such as when referring to processing the standard pre-defined OAM function across different communication protocols of the same and/or different layers.

Optionally, the GOAM functionality is provided across different packet communication mechanisms (e.g., communication protocols such as IP, MPLS, and Ethernet), which may operate at the same layer, or at different layers. The single GOAM or multi-level OAM functionality may be provided across the different communication protocols, such as instead of requiring separate OAM function execution for each respective communication mechanism. It is noted that the GOAM functionality may be applied in the case of across the same packet communication protocol, which may operate at the same layer.

The systems and/or methods include a multi-layer PDU denoting at least one OAM function for implementation within the packet data network.

A multi-layer indication within a header of a protocol specific packet transporting the PDU defines the standard OAM for multi-layer processing. The multi-layer indication denotes multi-layer processing of the protocol specific OAM within the transporting packet, to extend the OAM function to provide multi-layer functionality. The multi-layer indication may also denote intra-layer processing across different transport protocols of the same layer. The OAM function may be implanted across different logical communication layers based on the multi-layer indication. For example, the multi-layer indication may denote implementing the OAM of the PDU at one or more of: at all logical communication layers of the receiving device, at the current layer and upper layer, only at a higher layer, only at the current layer.

As used herein, the term multi-layer indication may sometimes be interchanged with the term GOAM indication, when the encapsulating packet carries the standard OAM function for multi-layer processing and/or intra-layer processing.

As used herein, the term PDU may sometimes be interchanged with the term GPDU, when the standard OAM function provides the basis for multi-layer processing and/or intra-layer processing.

Optionally, packet technologies, such as communication protocols, share the same tool-set, frame format and/or methodologies defined by the GOAM functions.

As described and exemplified below, the GOAM methods and/or systems described herein may simplify troubleshooting of complex multi-layer technology (e.g., communication protocols such as Ethernet, IP, and MPLS) network problems. Troubleshooting may be performed in a multi-layer fashion across different logical layers, instead of, for example, a layer by layer method. Troubleshooting may be performed in an intra-layer fashion, across different communication protocols and/or entities (e.g., link, tunnel, service) of the same layer, instead of, for example, separate troubleshooting for each different technology and/or entity.

Before explaining the disclosure in detail, it is to be understood that the disclosure is not necessarily limited in its application to the details of construction and the arrangement of the components and/or methods set forth in the following description and/or illustrated in the drawings and/or the Examples. The disclosure is capable of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
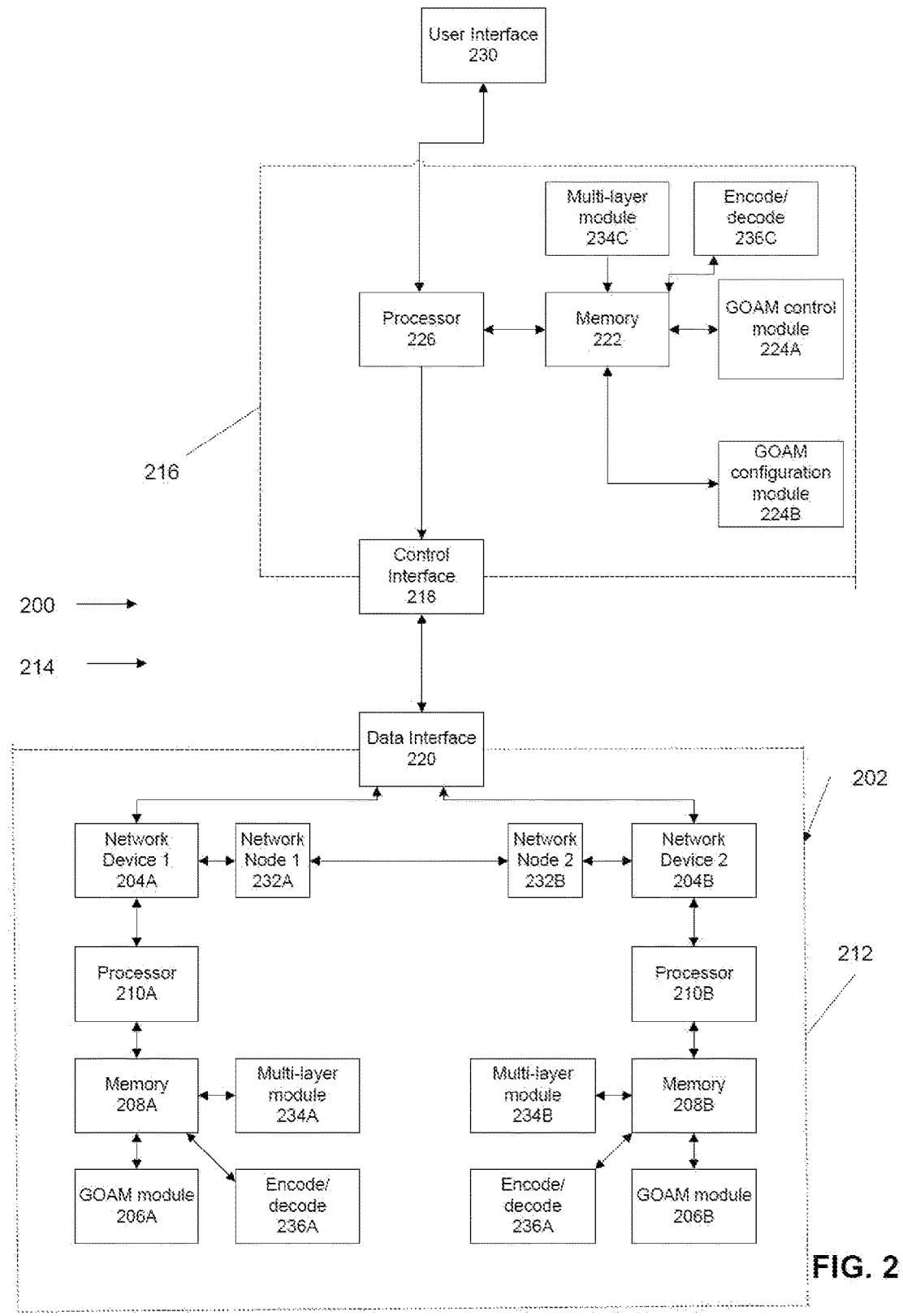
FIG. 2 is a block diagram of a system for executing one or more OAM functions in a packet data network.

Reference is now made to FIG. 1, which is a computerized method of executing one or more GOAM functions in a packet data network, in accordance with the present disclosure. Alternatively or additionally, the method of FIG. 1 executes one or more OAM functions across multiple logical communication layers. Reference is also made to FIG. 2, which is a block diagram of an exemplary system 200 for executing one or more GOAM functions in a packet data network, and/or for executing one or more OAM functions across multiple logical communication layers of the network, in accordance with the present disclosure.

The systems and/or methods of FIG. 1 and/or FIG. 2 may provide for a single command to be executed, to perform OAM or GOAM functionality across any two or more devices within the network, independent of the logical communication layer and/or packet transport protocols of the devices themselves, and/or intermediate devices thereof. In this manner, the same command may be run to perform the OAM or GOAM function, for example, without having to select specific OAM functions for each specific transport protocol and/or communication layer between and/or include the devices to be analyzed. Such simple (i.e., single) command execution may simplify network operation, administration and/or maintenance tasks. The single command may be executed within a SDN, such as by the controller of the SDN. The SDN may allow configuration of devices and/or nodes within the network based on a generic identification scheme, which allows execution of the GOAM. The SDN running the GOAM and/or multi-layer OAM functions may be able to automatically execute such functions as required. The single command execution may simplify or enable implementation of the automatic execution of the GOAM functions. The automatic execution of the GOAM functions may be utilized by device-aware functions of the SDN, for example, to automatically diagnose problems in the network, automatically maintain the network, and/or automatically adjust the network as needed.

The systems and/or methods described herein provide for a connectivity check (or other functions) between arbitrary points within a multi-technology (e.g., communication protocol) network connection.

The systems and/or methods described herein provide for single GOAM function execution to perform an overall function over multiple logical communication layers. The single GOAM function may be, for example, communication verification between a first network node of a first network device at a first logical communication layer, and at a second network node of a second network device at a second different logical communication layer. The communication verification may check the communication link between the first and second node, for example, tracing the path along the link and/or analyzing the performance of the link.

Optionally, all intermediate network nodes between the first and second nodes and/or device may respond to the GOAM (e.g., GPDU), at all logical communication layers of each respective intermediate network node.

In one example, the GOAM function is a layer 3 communication verification between a network device processing both layer 2 headers and layer 3 headers, and another network device processing layer 2 headers (but not layer 3 headers). The GOAM function allows verification of the both processing devices, to check both layers 2 and 3, with a single GOAM function, as opposed to, for example, requiring different OAM functions, one for layer 3 and another for layer 2.

The systems and/or methods described herein allow re-use of OAM tools between different technologies, based on the generic OAM mechanism. For example, a single definition of a trace function between two devices (or nodes) may be used across different devices at different communication layers and/or different transport protocols. Each technology may use the same GOAM mechanism to perform GOAM functions. Existing OAM hardware, firmware and/or software components may be reused to address future technologies and/or add advanced functions to existing technologies. Re-use of low-level software components may enable new functionality without the need to upgrade the network device. For example, to add new functionality, a single software module may be defined with the new functionality The same software module may be loaded on all network devices to enable the new functionality, instead of, for example, having to buy new equipment, adding different software modules to different devices, or otherwise having to customize the network to enable the new function.

The GOAM mechanism described herein may improve time-to-market of new protocols and/or new technologies. Customized OAM functions may not need to be developed for the new protocol, as the new protocol may use the GOAM mechanism described herein. By utilizing the GOAM framework, protocol definitions, development, integration and/or management of every new OAM for every new protocol and/or function may be avoided.

The GOAM mechanism described herein may be extensible, so that a new function added to the GOAM suite may be projected on any protocol and/or technology. The function need only be added once to the GOAM definition, instead of, for example, re-defined for each protocol and/or technology.

Moreover, network operation staff may not need to be retrained on OAM functions defined for every protocol and/or technology. Only one protocols needs to be learnt, as other protocols are encapsulated within the learnt protocol.

Optionally, at 102, the GOAM mechanism is installed (or is pre-existing) within a data packet network 202. Data packet network 202 may includes at least two network devices 204A 204B (e.g., switch, router, hub, gateway, bridge, and repeater server), which may have one or more network nodes (e.g., physical ports, logical ports, software ports) operating at different logical communication layers (e.g., layer 1, layer 2, layer 3, layer 4, layer 5, layer 6, layer 7, or intermediate layers thereof) and/or with different packet communication protocols (e.g., Ethernet, MPLS, and IP). Devices 204A 204B may be directly connected (e.g., using a cable and/or wireless connection), and/or may be connected through one or more intermediate devices (not shown for clarity).

The GOAM mechanism may be installed as a software application, such as a GOAM module 206A 206B, on one or more memories 208A 208B of each respective network device 204A 204B. Modules 206A 206B may contains instructions for execution by one or more respective processors 210A 210B of devices 204A 204B. GOAM modules 206A 206B may provide GOAM services at different network layers, to different network nodes of the devices, and/or to different communication protocols. Alternatively or additionally, the GOAM mechanism is installed as one or more hardware and/or firmware units, such as a box and/or card that plugs into network 202, and/or plugs into device 204A 204B.

Multi-layer functionality for predefined OAM functions may be provided by one or more multi-layer modules 234A-C.

Network 202 may contain a data plane 212 of a software defined network (SDN) 214. SDN 214 may include a control plane 216 for controlling data plane 212, such as through a control interface 218 communicating with a data interface 220. Data plane 212 may be decoupled from control plane 216. Control plane 216 may include one or more memories 222 having stored thereon a GOAM control module 224A for performing one or more GOAM functions on network 202, such as to analyze a connection between two network devices and/or network nodes. Module 224A may contain instruction for execution by one or more SDN control processors 226.

Alternatively or additionally, GOAM is installed in other systems for controlling and/or managing packet networks, for example, an operations support system (OSS), a network management system (NMS), as part of the network operating system (OS), as part of dedicated hardware (e.g., box integrated within the network, hardware cards to plug into existing devices), firmware, and/or software applications.

A user interface 230 (e.g., monitor, keyboard, mouse, voice recognition software, and the like) may allow a user to configure network 202 for GOAM functionality, and/or use GOAM functions to monitor, troubleshoot and/or otherwise administer network 202.

The use of generic format and/or processing may enable the use of the same objects, routines, components and/or methods to address several technologies. Based on the generic OAM functions, the specific use and/or encapsulation may be hidden from the Management/Control applications. For example, SDN control plane 216 may hide the technology specific information to provide a standard and/or simple application programming interface (API) to the OSS and/or NMS.

The multi-layer and/or intra-layer GOAM functions may be automatically performed, for example, by the SDN control plane.

Optionally, at 104, network 202 is configured for performing one or more GOAM functions, for example, automatically by a software module and/or manually by a network operator. Configuration may be performed automatically (e.g., by a GOAM configuration module 224B, optionally part of SDN controller 216) and/or manually by a network operator. Configuration may include, for example, setting up network devices and/or network nodes into different maintenance entities (ME), for example, as defined by Y.1731. The maintenance entities may be organized into maintenance entity groups (MEG). Each MEG may be assigned a MEG level, for example, customers having the highest level, providers having relatively lower levels, and operators having the lowest levels. One or more MEs within the MEG may be defined as maintenance entity end points (MEG), for handling packet traffic into the MEG and out of the MEG. One or more MEs within the MEG may be defined as maintenance entity intermediate points (MIP), for handling packet traffic within the MEG itself.

Each ME and/or ME type may be assigned one or more generic identification numbers (IDs). The generic identification may be based on a unified generic identification scheme assigned to maintenance entities and/or maintenance points of different network nodes and/or network devices operating different transmission protocols and/or operating at different logical layers. In this manner, the devices and/or network nodes within the network may be organized together, under a common generic ID system, independently of underlying network layer operation and/or packet communication protocol.

Other suitable organizational and/or classification structures may be used, for example, the organizational and/or classification scheme may be customized by the network administration, or in another example, each device or node may be assigned a unique number without hierarchical arrangements.

Optionally, control plane 216 configures the logical communication layer and/or entity status for each receiving and/or transmitting maintenance point and/or maintenance entity of the network, which may enable local GPDU identification and/or cross layer GOAM functions.

Optionally, at 106, one or more GOAM functions are selected for execution within network 202, for example, automatically by a software module (e.g., GOAM control module 224A) and/or manually by the network operator from user interface 230. The GOAM functions may be implemented and/or executed across and/or between two devices, and/or two network nodes within the network. The two devices and/or network nodes may be operating at different logical layers and/or may be operating with different packet transmission protocols.

Alternatively, one or more pre-defined standard OAM functions are selected for multi-layer execution within network 202.

The GOAM functions may be implemented to check connectivity (e.g., for troubleshooting), analyze network performance, monitor network behavior, or other functions. Exemplary functions include continuity verification, loopback (ping), link-trace, connectivity check, fault localization, performance measurements, and other functions.

The GOAM may be a comprehensive OAM suite to address various functions.

Optionally, GOAM is based on the Y.1731 standard or other standards. The Y.1731 standard may provide a comprehensive tool-set of functions, some or all of which may be defined as part of the GOAM.

At 108, a GPDU to implement the selected GOAM function is generated, for example, by GOAM module 206A-B and/or GOAM control module 224A. The GPDU frame format is designed to be a unified frame format that may be handled at different logical layers, by different communication protocols, and/or by different technologies.

Alternatively, a PDU to implement the selected OAM function is generated, for example, by existing defined OAM function of specific transport protocols.

The GPDU may contain one or more address fields. Optionally, the address field identifies the originating network device and/or network node, such as the first device and/or node in the communication path within the network that is being analyzed. Alternatively or additionally, the address field identifies the target network device and/or network node, such as the last device and/or node in the communication path within the network that is being analyzed. The address fields may contain both the originating node and the target node. One or both address fields may be present in message packets sent from the originating node to the target node, and/or in reply packets sent back to the originating node from the target node and/or from intermediate nodes along the communication path.

The GPDU address field may be based on a generic identification index that is independent of the logical communication layer and/or the communication protocol, such as the maintenance entity classification scheme described with reference to block 104. Alternatively or additionally, the GPDU address field may be the communication protocol related assigned address (or other technology related assigned address), which may be independent of the communication protocols transmitting the GPDU containing packets. For example, the GPDU address may be an Ethernet address, an IP v4 address, an IP v6 address, or other protocol addresses.

The GPDU address may be implemented based on a flexible type-length-value (TLV) field of the GPDU frame. For example, the Y.1731 standard provides a customizable TLV field, which may be used to define the address within the GPDU.

Figure 3:
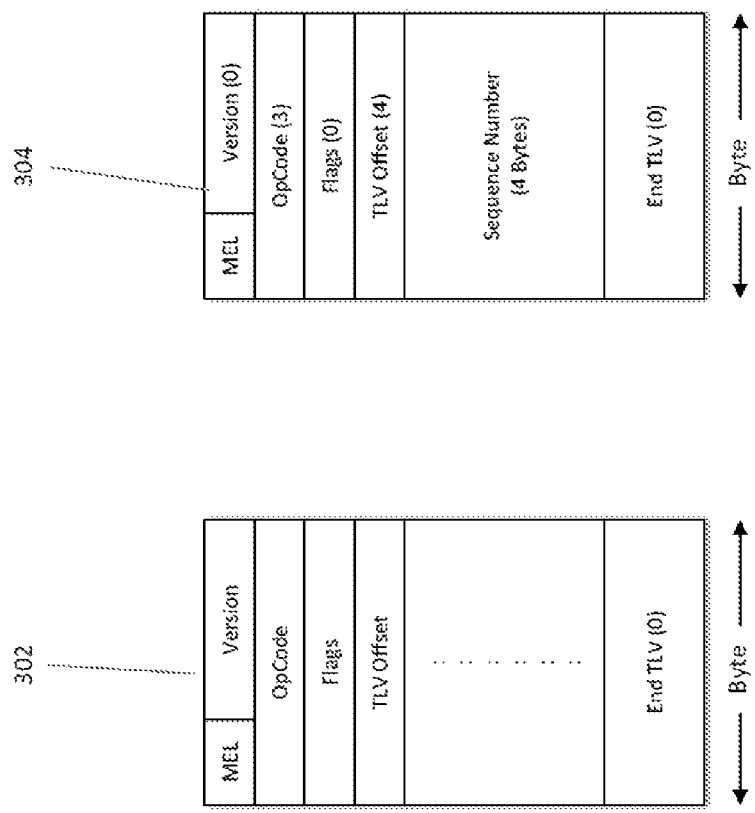
FIG. 3 is a schematic diagram depicting GPDU frame formats.

Reference is now made to FIG. 3, which is a schematic diagram depicting exemplary GPDU frame formats based on the Y.1731 standard, in accordance with the present disclosure. The TLV Offset field may be used to implement the GPDU address field described. The other fields may be defined by the Y.1731 standard, for example, the MEL field denotes the MEG level of the GPDU (e.g., originating from the first network device and/or node in the link), the version field denotes the GOAM version, the OpCode denotes the type of GPDU, the flag field depending on the GPDU type, the end TLV denoting the end of the GPDU.

Frame 302 is an exemplary common GPDU frame format. Frame 304 is an exemplary Ping/loopback (LB) GPDU frame format, which may be 4 bytes long and containing a sequence number to perform the loopback function.

The frame formats may be based on other protocols, and/or may be custom designed.

Referring back to FIG. 1, at 110, the GPDU is encapsulated in a packet having a header for transmission based on a certain transmission protocol at a certain logical communication layer, for example, by GOAM module 206A-B and/or GOAM control module 224A. The GPDU may be encapsulated within a portion of the packet defined to carry payload. The header contains an indication denoting the presence of the GPDU within the packet. The indication may denote the processing of the GPDU by intermediate (and/or final) network devices, network nodes, and/or maintenance points, such as along the communication path being analyzed, between two network devices and/or nodes. The indication provides flexibility to perform multi layer and/or cross layer GOAM functions.

Alternatively, the PDU is encapsulated in the packet, with a multi-layer indication in the header.

The header indication allows for the GPDU frame to be independent of the transmission protocol and/or logical communication layer. The same GPDU frame may be transported by different transmission protocols and/or at different logical layers.

Optionally, the header includes identification information denoting processing the GPDU to implement the related GOAM function at all logical communication layers of the receiving maintenance point (and/or network device and/or network node), for example, denoted by aGOAM. Alternatively or additionally, the header includes identification information denoting processing the GPDU to implement the respective GOAM function at two or more different logical communication layers of a receiving maintenance point, for example, the current layer and the upper layer, for example, denoted by cuGOAM. Alternatively or additionally, the header includes identification information denoting trapping the GPDU at the current logical layer, and passing the GPDU to an upper logical communication layer above the logical communication layer forwarding the packet, for example, denoted by uGOAM. The GPDU may be extracted and/or passed on to the higher logical layer for implementation of the GOAM function at the higher layer. Alternatively or additionally, the header includes identification information denoting processing the GPDU to implement GOAM functions at the current logical layer, for example, denoted by cGOAM.

In the case of extending predefined OAM protocol functions, the header includes a multi-layer indication for processing the OAM function at multiple layers. Based on the above GOAM indications, exemplary multi-layer indications include: aOAM, cuOAM, uOAM, and cOAM.

The multi-level processing may be performed, for example, by multi-layer modules 234A-C.

The header indications may be automatically assigned and/or reassigned at each respective maintenance point (and/or network device and/or network node), for example, by respective GOAM modules 206A and/or 206B.

Headers with GOAM indications may be encapsulated within other headers with GOAM indications, for example, during multi-layer packet transport.

GOAM indications may be defined within existing headers implemented as part of communication protocols, such as within customizable fields within the headers.

Figure 4A:
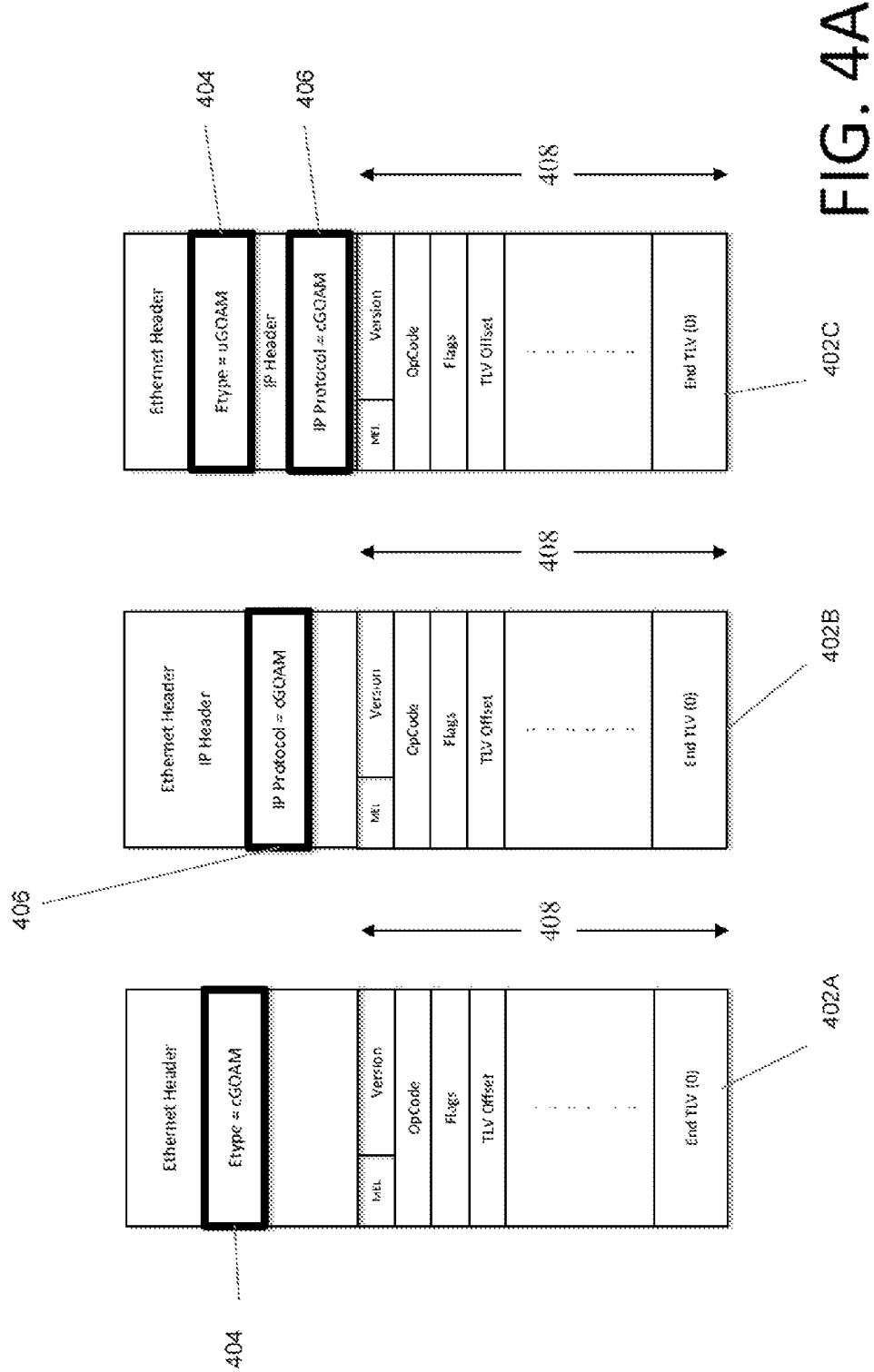
FIG. 4A illustrates frame examples of Ethernet packet, IP packet, and IP-Ethernet packet.
Figure 4B:
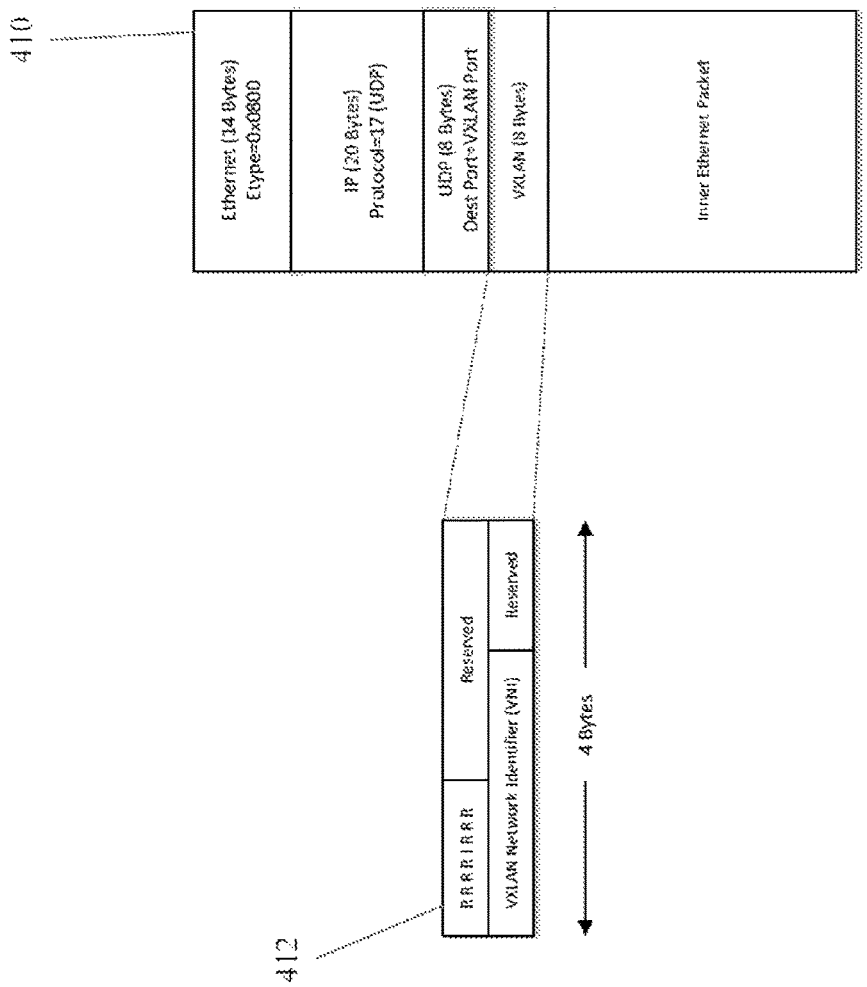
FIG. 4B illustrates a virtual extensible local area network (VXLAN) frame format.
Figure 4C:
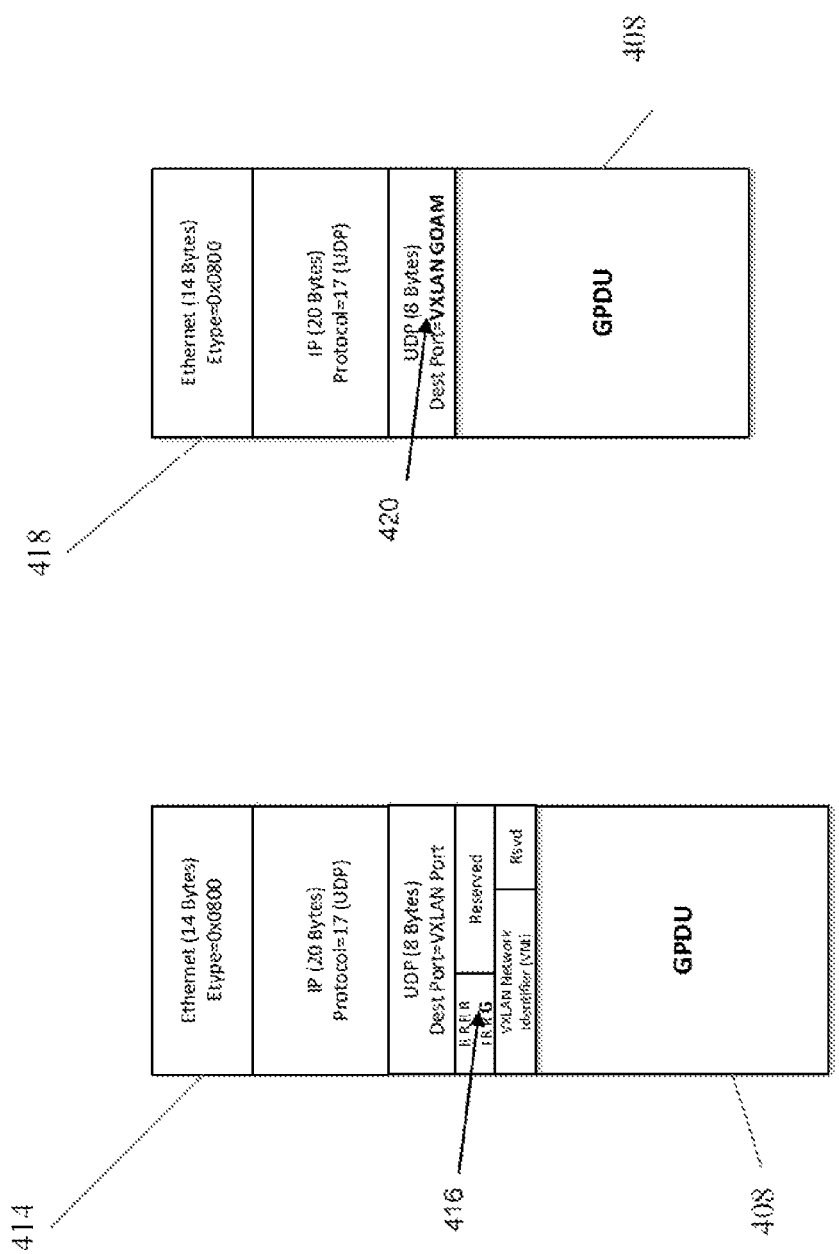
FIG. 4C illustrates examples of a VXLAN VNI packet and a VXLAN VTEP packet.

Reference is now made to FIGS. 4A-4C, which are schematics of exemplary frames of packet transfer protocols with customizable fields denoting GOAM indications, in accordance with the present disclosure. The frames may carry PDU denoting standard OAM functions, in which case the customizable fields denote multi-layer indications.

An Ethernet packet 402A, such as used by a layer 2 switch, contains an Etype field 404 in the header, which is customized to denote the GOAM indication. A GPDU 408 corresponding to a selected GOAM function is encapsulated within packet 402A. Etype field 404 illustrates the example of containing the cGOAM indication, which will be processed at layer 2 devices within the data communication path, to implement the GOAM function defined by GPDU 408 within packet 402A.

In another example, an IP packet 402B, such as used by a layer 3 router, contains an IP Protocol field 406 within the IP header, which is customized to denote the GOAM indication. IP protocol field 406 illustrates the example of containing the cGOAM indication, which will be processed at layer 3 devices within the data communication path, to implement the GOAM function defined by GPDU 408 within packet 402B.

In yet another example, an encapsulated IP-Ethernet packet 402C includes an IP header encapsulated within an Ethernet header. Etype 404 of the Ethernet header has an indication of uGOAM, which indicates to the layer 2 device to extract GPDU 408 from the packet, and send GPDU 408 to the upper layer 3. The layer 3 application reads IP Protocol 406 indication cGOAM, and processes GPDU 408, to implement the respective GOAM function at the layer 3 level. In this manner, a layer 2 device, such as a switch, responds to a layer 3 function, such as PING.

FIGS. 4B and 4C illustrate a more complex example, of a GOAM indication in existing header frames which are nested within other packets and/or other header frames. FIG. 4B illustrates a virtual extensible local area network (VXLAN) frame format 410, including a VXLAN header 412. VXLAN is defined by IETF (Internet Engineering Task Force) standard body. VXLAN is designed to addresses the need for overlay networks within virtualized data centers accommodating multiple tenants. VXLAN runs over the existing networking infrastructure and provides Layer 2 network overlay scheme over a Layer 3 network. VXLAN defines a VXLAN Tunnel End Point (VTEP) and/or a VXLAN Network Identifier (VNI). The VTEPs connect a server, a hypervisor, and/or other device to the IP network. The function of the VTEP is to encapsulate the virtual machine (VM) traffic within a user datagram protocol (UDP) plus IP header, to send across an IP network. The VMs are unaware of VXLAN implementation. The VTEP distinguishes between the tenants using the VNI identifier.

FIG. 4C illustrates a VXLAN VNI packet 414 containing GPDU 408 to perform one or more GOAM functions. A GOAM indication G 416 is defined by one or more portions of the VXLAN header, for example, the reserved bits. FIG. 4C also illustrates a VXLAN VTEP packet 418, containing GPDU 408 to perform one or more GOAM functions. A GOAM indication VXLAN GOAM 420 is defined, for example, by the destination port of the UDP header.

In this manner, GOAM functions are performed over the VXLAN, including VTEP and/or VNI. The VXLAN, VTEP and/or VNI may be maintenance points within a communication path being analyzed by the GOAM function.

Other portions of the Ethernet, IP and/or VXLAN headers may be customized to provide the GOAM indication. In a similar manner, header portions of other packet communication protocols may be customized to provide GOAM indications.

Referring back to FIG. 1, at 112, the packet with one or more headers (optionally encapsulated) having the GOAM indication is transmitted along the communication path being analyzed, for example, by modules 208A 208B 224A, or other transmission hardware and/or software. Transmission may be performed, for example, from one maintenance point to another maintenance point, from one network device to another network device, and/or from one network node to another network node. Transmission may depend on the network labeling scheme.

Transmission may be performed between different layers and/or based on different communication protocols, for example, from a layer 3 device to a layer 2 device.

At 114, the transmitted packet is received at the maintenance point, network node and/or network device. The GOAM indication within the header is analyzed to determine further processing of the GPDU, for example, by GOAM module 206A-B and/or GOAM control module 224A.

Optionally, at 116, the GPDU is processed at the received logical layer and/or based on the received packet transmission protocol, for example, by GOAM module 206A-B and/or GOAM control module 224A. The GOAM function defined by the GPDU may be implemented at the received logical layer, and/or based on the received packet transmission protocol.

Alternatively or additionally, at 118, the GPDU is optionally extracted and passed to a different logical layer and/or different packet transmission protocol optionally of the same layer, for example, by GOAM module 206A-B and/or GOAM control module 224A. The GPDU packet may be passed to a higher logical layer for processing. The GOAM function defined by the GPDU may be implemented at the higher logical layer, and/or based on the defined packet transmission protocol. The GPDU packet may be passed intra-layer, for processing by a different transmission protocol at the same logical layer.

Optionally, the generic identification is processed by a network node along the communication path between the first node and second node, to extract the GPDU from the received logical communication layer for processing at a higher logical communication layer.

The same network device may implement the GOAM function at different network nodes operating at different transmission protocols and/or at different logical layers.

Optionally, at 120, the GPDU and/or the packet containing the GPDU is encapsulated and/or forwarded on to another maintenance point, network device and/or network node, for example, by GOAM module 206A-B and/or GOAM control module 224A. The forwarding and/or encapsulating of the GPDU may be respectively performed by each intermediate maintenance point, network device and/or network node along the communication path being analyzed by the GOAM function.

At 122, the GOAM data is analyzed to implement the selected GOAM function, for example, by SDN control plane 216, by GOAM module 206A-B and/or GOAM control module 224A. GOAM data, such as packets, may be analyzed from each intermediate network maintenance point, device and/or node, to analyze the communication path segment by segment.

Optionally, network 202 includes encoders for generating packets for GOAM function and/or packets for multi-level OAM function, and decoders for decoding the received packets. Optionally, decoding and/or encoding is performed by one or more encode/decode modules, such as modules 236A-C.

Different elements may act as encoders, for example, SDN control plane 216, network device 204A, network node 232A, or other network elements. The same network elements and/or different elements may act as decoders.

The encoder may perform one or more of the following:
  Generating the GPDU denoting the GOAM function and/or the PDU denoting the OAM function. (e.g., block 108)
  Encapsulating the GPDU and/or the PDU within a packet. (e.g., block 110)
  Marking the header of the encapsulating packet with the appropriate indication, such as the GOAM indication and/or the multi-layer indication. (e.g., block 110)
  Transmitting the packet. (e.g., block 112)

The decoder may perform one or more of the following:
  Receive the packet (e.g., block 114)
  Analyze the header indication to identify the type of PDU, such as the multi-layer PDU based on existing OAM protocols, and/or the GPDU. (e.g. block 116)
  Extract the PDU and/or GPDU. (e.g., block 116)
  Pass along the PDU and/or GPDU to the appropriate level. (e.g., block 118)
  Process PDU and/or GPDU at the current level, and implement the related OAM and/or GOAM function. (e.g., block 116)
  Pass the packet and/or PDU and/or GPDU to the next encoder. (e.g., block 120)

Figure 5A:
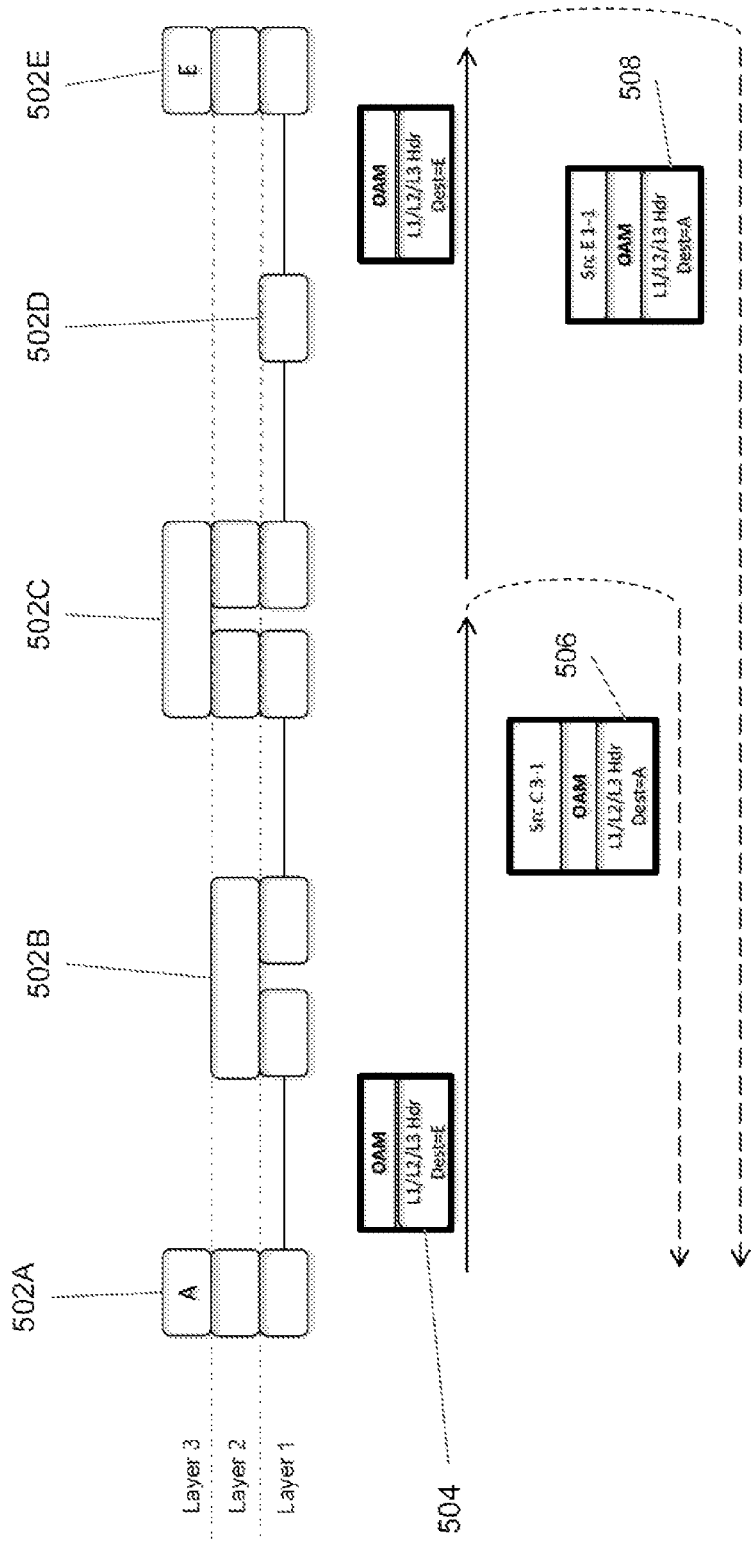
FIG. 5A is a schematic diagram illustrating an IP traceroute OAM function.

Reference is now made to FIGS. 5A and 5B, which are schematic diagrams of an example of operation based on the method of FIG. 1, and/or the system of FIG. 2, in accordance of the present disclosure.

Devices 502A 502C and 502E have layers 1, 2 and 3 capabilities, for example, routers. Device 502B has layer 1 and 2 capabilities, for example, a network switch. Device 502D only has layer 1 capability, for example, a network hub.

FIG. 5A is a schematic diagram illustrating an IP traceroute OAM function which is based on methods other than GOAM, such as OAM functions limited to specific protocols. In such methods, OAM functions are executed on one layer at a time, for example, layer 3 is traced separately from layer 2.

In the example of FIG. 5A, an IP traceroute is performed to analyze the communication path between device 502A and device 502E. An OAM message 504 defining the IP traceroute function is transmitted by node A of device 502A with a destination address of node E of device 502E. Only devices having layer 3 processing capabilities, such as routers, respond to OAM message 504. Device 502C responds by generating and transmitting message 506 back to node A of device 502A. Node E of Device 502E responds by generating and transmitting message 508 back to node A of device 502A. As exemplified, the IP traceroute only detects problems between layer 3 devices. Problems with layer 2 device 502B and/or layer 1 device 502D are not detected using the IP traceroute based on such methods, as devices 502B and 502D are transparent to the IP traceroute function. Layer 2 and layer 1 device connectivity needs to be analyzed using separate OAM functions based on layer 2 protocols and/or layer 1 protocols.

FIG. 5B illustrates the method of FIG. 1 and/or system of FIG. 2 applied to perform GOAM functions across devices 502A-E. Reference will be made to the method of FIG. 1 to trace the path of packets during the GOAM function. Alternatively, in a similar manner, FIG. 5B may illustrate the method of FIG. 1 and/or system of FIG. 2 applied to perform multi-layer and/or intra-layer functionality based on the standard OAM IP traceroute function.

As in block 102, GOAM functionality (or predefined OAM functionality is extended for multi-layer processing) is installed within the network, such as within an SDN network controller and/or within each network device. In the example of FIG. 5B, devices 510A 510C and 510E, such as routers, have layer 3 2 and 1 functionality. Device 510B, such as a switch, has layer 2 and 1 functionality. Device 510D, such as a hub, has only layer 1 functionality.

As in block 104, the network is configured for GOAM functionality (or multi-layer predefined OAM functionality). As illustrated in FIG. 5B, each network node at each logical layer may be configured with a different generic ID number.

For example, network nodes of device 510C are configured with sub-addresses 1-1 and 1-2 on layer 1, 2-1 and 2-2 on layer 2, and 3-1 on layer 3. Alternatively or additionally, existing protocol specific addresses are used, such as Ethernet and/or IP addresses.

As in block 106, a GOAM function (or pre-defined OAM function) is selected. In the example of FIG. 5B, the GOAM function traces the all layer route between device 510A and device 510E. The trace function sends a packet from device 510A to device 510E, and expects to receive back message packets from every network node at every logical layer of every network device encountered along the path.

As in block 108, a GPDU (or PDU denoting the pre-defined OAM function) is generated. The GPDU contains the destination address of the target network node, in this example, E-3-1, corresponding to node 3-1 of device 510E. In this manner, as the GPDU is extracted and/or processed at different layers and/or by different protocols, the destination address remains intact within the GPDU.

As in block 110, the GPDU is encapsulated within a packet 512 containing a header with a GOAM indication (or the PDU is encapsulated with a packet containing a header with a multi-layer indication). In the example shown, the header denotes aOAM, which is processed at all network layers to perform the GOAM function within the GPDU. The GPDU is encapsulated with 3 different headers, one for each of layers 1, 2 and 3. Each header may contain the aOAM indication.

As in block 112, packet 512 is transmitted from device 510A towards device 510E.

As in block 114, packet 512 is received by device 510B, at network node having sub-address 1-1.

As in block 116, the GPDU is processed by network node 1-1 (based on the aOAM indication in the header).

As in block 118, the GPDU is passed to higher layers for processing, to network node 2-1 of the same device 510B (based on the aOAM indication in the header). The GPDU is also passed to node 2-1 of the same layer 1 for processing.

In this manner, reply packets 514 are sent by network nodes 1-1, 2-1, and 1-2 of device 510B (denoted with address 'B'). The reply packets are based on the GOAM GPDU frame format, having the destination address of device 510A network node 3-1 within the GPDU. Optionally, each replying network node sends its own reply packet. Alternatively, a single reply packet is sent by device 510B, denoting all the responding nodes within the packet.

As in block 120, the process is iterated as packet 512 travels to destination device 510E. Reply packet(s) 516 is sent by device 510C, denoting responses by nodes 1-1, 1-2, 3-1, 2-2 and 2-1, of layers 1, 2, and 3. Reply packet(s) 518 is sent by device 510D, denoting a response by node 1-1 of layer 1. Reply packet(s) 520 is sent by device 510E, denoting a response by nodes 1-1, 2-1, and 3-1, of layers 1, 2 and 3.

As in block 122, the reply packets received at device 510A node 3-1 are analyzed. In this manner, the system analyzes the received packets to determine that the path to 510E has been fully traced, and that all network nodes at all logical layers are operating properly. Any fault along the path is quickly identified and/or isolated based on the execution of the single GOAM trace function.

In this manner, the GOAM (or multi-layer OAM extension) systems and/or methods described herein ease the troubleshooting of the network path describes in FIG. 5B. A single mechanism performs the overall multi-layer connectivity check.

The flowchart and block diagrams in the Figures illustrate the architecture, functionality, and operation of possible implementations of systems, methods and computer program products according to the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described with reference to specific features and embodiments thereof, it is evident that various modifications and combinations can be made thereto without departing from the spirit and scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

It is expected that during the life of a patent maturing from this application many relevant computer networks will be developed and the scope of the terms logic layer, network device, network node, communication protocol, and/or OAM are intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. It shall also be understood that the terms "or" and "and/or" used herein are intended to signify and include any or all possible combinations of one or more of the associated listed items, unless the context clearly indicates otherwise.

The word "optionally" is used herein to mean "is provided in some embodiments and not provided in other embodiments". Any particular embodiment of the disclosure may include a plurality of "optional" features unless such features conflict.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the present disclosure and its advantages have been described in detail, it should be understood that various changes, substitutions and alterations can be made herein without departing from the spirit and scope of the disclosure as defined by the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A method for transmitting packets denoting at least one operation, administration and maintenance (OAM) function on a data packet network, the method comprising:
    generating, by a controller, a frame denoting a protocol data unit (PDU) to implement at least one OAM function within the data packet network;
    encapsulating, by the controller, the PDU in a packet having a header; and
    transmitting, by the controller, the packet from a first network node to a second network node of the data packet network,
        wherein the PDU is a generic PDU (GPDU) for implementing at least one generic OAM (GOAM) function between the first network node and the second network node operating different transmission protocols, and the header includes GOAM indication information denoting a presence of the GPDU within the packet,
        wherein the GPDU includes at least one of a generic identification and a protocol related address,
        wherein the generic identification relates to at least one of the first network node and the second network node, and the generic identification is independent of a protocol related assigned address of at least one of the first network node and the second network node, and
        wherein the protocol related address relates to at least one of the first network node and second network node, and the protocol related address is independent of a communication protocol transmitting the frame.

2. The method of claim 1, wherein the GPDU includes the at least one GOAM function assigned to at least one of a plurality of transmission protocols and a plurality of logical communication layers.

3. The method of claim 1, wherein the generic identification is based on a unified generic identification scheme assigned to maintenance points of different network nodes and/or network devices operating at least one of different transmission protocols and at different logical communication layers.

4. A controller for transmitting packets denoting at least one operation, administration and maintenance (OAM) function on a data packet network, the controller comprising:
    a processor configured to generate a frame denoting a protocol data unit (PDU) to implement at least one OAM function within the data packet network, and encapsulate the PDU in a packet having a header; and
    a port configured to transmit the packet from a first network node to a second network node of the data packet network,
        wherein the PDU is a generic PDU (GPDU) for implementing at least one generic OAM (GOAM) function between the first network node and the second network node operating different transmission protocols and the header includes GOAM indication information denoting a presence of the GPDU within the packet,
        wherein the GPDU includes at least one of a generic identification and a protocol related address,
        wherein the generic identification relates to at least one of the first network node and the second network node, and the generic identification is independent of a protocol related assigned address of at least one of the first network node and the second network node, and
        wherein the protocol related address relates to at least one of the first network node and second network node, and the protocol related address is independent of a communication protocol transmitting the frame.

5. The controller of claim 4, wherein the generic identification is based on a unified generic identification scheme assigned to maintenance points of different network nodes and/or network devices operating at least one of different transmission protocols and at different logical communication layers.

6. An apparatus for performing at least one operation, administration and maintenance (OAM) function on a data packet network, the apparatus comprising:
    a port configured to receive a packet having a header and a frame, the frame denoting a protocol data unit (PDU) to implement at least one OAM function within the data packet network, the packet having been transmitted from a first network node to a second network node of the data packet network; and
    a processor configured to implement the at least one OAM function between the first network node and the second network node operating different transmission protocols,
        wherein the PDU is a multi-layer PDU denoting at least one OAM function for implementation within the packet data network, the processor is further configured to process a multi-layer indication within the header to process the PDU within the frame by the second network node and the at least one OAM function is implemented to provide at least one of multi-layer and intra-layer OAM functionality across the first network node and the second network node operating different transmission protocols, at the same logical communication layer or at different logical communication layers,
        wherein the PDU is a generic PDU (GPDU) denoting a generic OAM (GOAM) function, and the multi-layer indication comprises a GOAM indication,
        wherein the GPDU includes at least one of a generic identification and a protocol related address,
        wherein the generic identification relates to at least one of the first network node and the second network node, and the generic identification is independent of a protocol related assigned address of at least one of the first network node and the second network node, and wherein the protocol related address relates to at least one of the first network node and second network node, and the protocol related address is independent of a communication protocol transmitting the frame.

7. The apparatus of claim 6, wherein along a communication path between the first network node and second network node the at least one OAM function is implemented at different network nodes operating at the same or different transmission protocols, at different logical communication layers or at the same logical communication layer.

8. The apparatus of claim 6, wherein the multi-layer indication is processed by at least two network nodes, along a communication path between the first node and second node, to extract the PDU from the received logical communication layer for processing at a higher logical communication layer.

9. The apparatus of claim 6, wherein the multi-layer indication denotes processing the PDU to implement the at least one OAM function at all logical communication layers of a receiving maintenance point.

10. A method for performing at least one operation, administration and maintenance (OAM) function on a data packet network, the method comprising:
  receiving a packet having a header and a frame, the frame denoting a protocol data unit (PDU) to implement at least one OAM function within the data packet network, the packet having been transmitted from a first network node to a second network node of the data packet network;
  implementing the at least one OAM function between the first network node and the second network node operating different transmission protocols; and
  processing a multi-layer indication within the header to process the PDU within the frame by the second network node,
    wherein the PDU is a multi-layer PDU denoting at least one OAM function for implementation within the packet data network, and the at least one OAM function is implemented to provide at least one of multi-layer and intra-layer OAM functionality across the first network node and the second network node operating at the same or different transmission protocols, at the same logical communication layer or at different logical communication layers,
    wherein the PDU is a generic PDU (GPDU) denoting a generic OAM (GOAM) function, and the multi-layer indication comprises a GOAM indication,
    wherein the GPDU includes at least one of a generic identification and a protocol related address,
    wherein the generic identification relates to at least one of the first network node and the second network node, and the generic identification is independent of a protocol related assigned address of at least one of the first network node and the second network node, and
    wherein the protocol related address relates to at least one of the first network node and second network node, and the protocol related address is independent of a communication protocol transmitting the frame.

11. The method of claim 10, wherein the multi-layer indication is processed by at least two network nodes, along a communication path between the first node and second node, to extract the PDU from the received logical communication layer for processing at a higher logical communication layer.

12. The method of claim 10, wherein the multi-layer indication denotes processing the PDU to implement the at least one OAM function at all logical communication layers of a receiving maintenance point.

13. The method of claim 10, wherein the multi-layer indication denotes processing the PDU to implement OAM functions of a received logical communication layer and an upper logical communication layer of a receiving maintenance point.

14. The method of claim 10, wherein along a communication path between the first network node and second network node the at least one OAM function is implemented at different network nodes operating at the same or different transmission protocols, at different logical communication layers or at the same logical communication layer.

15. The method of claim 14, wherein the multi-layer indication denotes processing the PDU to implement OAM functions at a higher logical communication layer than the logical communication layer of the received packet.

16. The method of claim 10, wherein a single OAM function is executed to perform an overall function over multiple logical communication layers.

* * * * *